United States Patent [19]
McNaught

[11] 3,900,503
[45] Aug. 19, 1975

[54] RANDOMLY INTERESTERIFIED SUNFLOWER AND TOBACCOSEED OILS

[75] Inventor: John P. McNaught, Saddle River, N.J.

[73] Assignee: Lever Brothers Company, New York, N.Y.

[22] Filed: Oct. 6, 1972

[21] Appl. No.: 295,744

Related U.S. Application Data

[60] Division of Ser. No. 77,757, Oct. 2, 1970, Pat. No. 3,746,551, Continuation-in-part of Ser. No. 10,313, Feb. 10, 1970, abandoned.

[52] U.S. Cl. .............. 260/410.7; 426/189; 426/194; 426/362; 426/417
[51] Int. Cl. .............................................. C11c 3/10
[58] Field of Search .......... 260/410.7; 426/189, 194

[56] References Cited
UNITED STATES PATENTS

| | | | |
|---|---|---|---|
| 2,921,855 | 1/1960 | Melnick et al. | 99/122 |
| 3,600,195 | 8/1971 | Westenberg | 99/122 |
| 3,748,348 | 7/1973 | Sreenivasan | 260/410.7 |

OTHER PUBLICATIONS

Chakrabarty et al., J. Chromatography, Vol. 31, pp. 556–559 (1967).

*Primary Examiner*—Donald G. Daus
*Assistant Examiner*—Diana G. Rivers
*Attorney, Agent, or Firm*—Kenneth F. Dusyn; Melvin H. Kurtz

[57] ABSTRACT

The specification describes a highly nutritive margarine containing a high proportion of polyunsaturated acids. The margarine is physically stable with respect to texture at deep-freeze storage temperatures (e.g., −10°F) when at least 25 percent of the oil therein having a high polyunsaturated content has been randomly interesterified.

2 Claims, No Drawings

RANDOMLY INTERESTERIFIED SUNFLOWER AND TOBACCOSEED OILS

This application is a division of application Ser. No. 77,757, filed Oct. 2, 1970, now U.S. Pat. No. 3,746,551, which is a continuation-in-part of application Ser. No. 10, 313, filed Feb. 10, 1970, and now abandoned.

BACKGROUND OF THE INVENTION

1. Field of the Invention

This invention relates to a margarine having a high polyunsaturated fatty acid (alternatively referred to hereinafter as fatty acid or fat) content and a low saturated fatty acid content and which is physically stable with respect to texture change at deep-freeze storage temperatures, e.g., $-10°F$. Such stability is achieved by employing in the margarine randomly interesterified oil having at least 65 percent polyunsaturated fatty acids, as more fully set forth hereinafter.

It is well known that the natural glyceridic oils and fats are mixtures comprising glyceryl esters of fatty acids having different chain lengths and different degrees of unsaturation.

In recent years, nutritionists and medical practitioners have become increasingly aware of the dietary importance of polyunsaturated fats. The polyunsaturated fatty acids are, according to authorities, a dietary requirement for protection against fat-deficiency symptoms. Linoleic, linolenic, and arachidonic acids have been recognized as the chief polyunsaturated fatty acids which possess an appreciable biopotency in counteracting fat deficiency.

Linoleic, linolenic, and arachidonic acids are straight-chain aliphatic monocarboxylic acids, referred to in the art as fatty acids, which occur in nature combined as esters with glycerol. They have two, three, and four olefinic double bonds respectively in their molecular structure, and may be represented as follows:

Linoleic acid: 9, 12,-octadecadienoic acid

Linolenic acid: 9, 12 15-octadecatrienoic acid

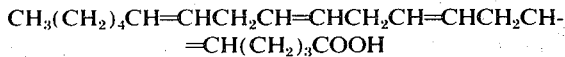

Arachidonic acid: 5, 8, 11, 14-eicosatetraenoic acid

Polyunsaturated acids of the type described above are believed to be required for growth and for the maintenance of normal skin conditions by a wide variety of animals, including man. These fatty acids mediate not only growth but also certain diverse functions such as protection from x-irradiation injury, maintenance of capillary resistance in the skin capillaries, and the normal transport and metabolism of cholesterol.

Abnormally high blood cholesterol levels have been associated with atherosclerosis, leading medical authorities to prescribe diets which include polyunsaturated fats in an effort to lower cholesterol levels.

Many medical experts believe that there is a relationship between the intake of polyunsaturated fatty acids and the level of plasma cholesterol. It has been reported that high levels of blood cholesterol can be reduced when large amounts of vegetable fats are included in the diet, and that the level will be increased when large amounts of animal fats are taken. The present-day trend toward the use of hydrogenated oils in food products leads to a lessened intake of essential fatty acids, resulting in the esterification of body cholesterol with saturated fatty acids. These esters are not readily disposed of by the body, nor are phospholipids containing saturated fatty acids, but are retained to a great degree in the plasma. They may cause atheroma, a disease characterized by fatty degeneration of the inner coat of the arteries, and may increase the coagulability of the blood, and contribute to coronary and cerebral thrombosis.

An elaboration of the effects of polyunsaturated fatty acids in the body may be found in "Lipids" by H.J. Deuel, Jr., Vol. III, 1957, pps. 800–834.

Arachidonic acid occurs to some extent in marine oils, although these oils are not considered suitable for use in margarine without hydrogenation. The acid occurs only in very smalal amounts in animal fats, and for all practical purposes not at all in vegeable oils. Thus it is impractical to attempt to introduce a high arachidonic acid content into a food product by the incorporation of a naturally occurring fat therein. This acid however is synthesized in the body by conversion from linoleic acid. Linoleic and linolenic acids are not synthesized in the body and must be taken in the diet.

Linoleic acid, usually along with small amounts of linolenic acids occurs at a relatively high level combined as glycerides in a great number of well-known edible vegetable oils, for example safflower, tobaccoseed, sunflower, corn, soya, cottonseed, peanut, sesame, etc., as shown in table 1, below.

It will be recognized that the fatty acid percentages shown in the table are regarded as typical only, and that the percentages may vary with climate and geographical location.

Within this group of oils, those having 65 percent or more polyunsaturated fatty acids are within the instant invention. Normally these will be safflower and tobaccoseed oils, although any triglyceride oils of which special high-linoleic acid varieties may be grown are suitable provided that they can be formulated with a hard stock to provide a margarine having a ratio of polyunsaturated acid to saturated acid of at least about 3.5 to 1.

Sunflower oil is an example of an oil having one or more varieties with a higher linoleic acid content than does the conventional variety having the analysis shown in

TABLE I

TYPICAL COMPOSITIONS OF SOME SELECTED OILS
Bailey's Industrial Oil and Fat Products, Third Ed., Interscience Publishers, 1964

| Fatty Acid | Corn | Cotton-seed | Hemp-seed | Lin-seed | Olive | Palm | Pea-nut | Saf-flower | Sun flower | Sesame | Rape-seed | Mustard-seed | Tobacco-seed | Tea-seed |
|---|---|---|---|---|---|---|---|---|---|---|---|---|---|---|
| Total saturated | 17 | 24 | 8 | 10 | 16 | 53 | 17 | 11 | 15 | 17 | 15 | 6 | 5 | 11 | 9 |
| Unsaturated: | | | | | | | | | | | | | | | |
| $C_{16}$ and lower | — | — | — | — | 2 | — | — | — | — | — | — | — | — | — |
| Oleic $C_{18:1}$ | 29 | 25 | 12 | 22 | 64 | 38 | 61 | 13 | 25 | 29 | 40 | 19 | 22 | 14 | 80 |
| Linoleic $C_{18:2}$ | 54 | 51 | 55 | 16 | 16 | 9 | 22 | 75 | 51 | 52 | 43 | 14 | 15 | 75 | 11 |

TABLE 1-continued

TYPICAL COMPOSITIONS OF SOME SELECTED OILS
Bailey's Industrial Oil and Fat Products, Third Ed., Interscience Publishers, 1964

| Fatty Acid | Corn | Cotton-seed | Hemp-seed | Lin-seed | Olive | Palm | Pea-nut | Saf-flower | Sun flower | Sesame | Rape-seed | Mustard-seed | Tobacco-seed | Tea-seed |
|---|---|---|---|---|---|---|---|---|---|---|---|---|---|---|
| Linolenic $C_{18:3}$ | — | — | 25 | 52 | 2 | — | — | 1 | 9 | 2 | 2 | 8 | 7 | — | — |
| Eicosenoic $C_{20:1}$ | — | — | — | — | — | — | — | — | — | — | — | 13 | 7 | — | — |
| Erucic $C_{22:1}$ | — | — | — | — | — | — | — | — | — | — | — | 40 | 44 | — | — |

The figures are those obtained by GLC analysis where available. Some figures are selected as "most probable" within a given range.

table 1. Varieties are known having 65 percent or more linoleic acid.

It is not within the ambit of the present invention to have for an object the alleviation of fat-deficiency symptoms, nor is there any representation that the product of the invention has curative properties. However there has been discovered a way to provide those who wish to use a margarine containing a high level of polyunsaturated fatty acids with a product that is texture stable at deep-freeze storage temperatures such as minus 10°F., as explained in detail hereinafter.

Safflower oil and other polyunsaturated fats are currently marketed as salad oils, and persons desiring to enrich their intake of polyunsaturated fats can avail themselves of these products. It is evident that there is a need for other edible products containing high proportions of polyunsaturated fatty acids to enlarge the scope of availability of such products to persons desiring to increase their intake of polyunsaturated fatty acids.

One of the most popular foods is margarine, which is a food consumed in large quantities, and by people of all agess. Margarine contains at least 80 percent aleaginous matter (imitation margarines contain substantially less), and in view of its widespread use, is a particularly suitable product for the incorporation of an oil having at least 65 percent polyunsaturated fatty acids.

In order to introduce as much polyunsaturated fatty acids, relative to the saturated fatty acids, as possible into the diet through the use of margarine, the liquid oil fraction of the margarine will be non-hydrogenated and will advantageously be an oil that contains the highest proportion of polyunsaturated acids combined as triglycerides.

Safflower oil is available in commercial quantities and has the highest linoleic acid content of the vegetable oils available in large volume, and for this reason is the preferred oil for use to provide the highest possible polyunsaturated acid content and the lowest saturated fatty acid content.

However when safflower oil or other oil having at least 65% polyunsaturated acids is used, the margarine has a serious defect in that when it is stored under deep-freeze conditions, e.g., about −10°F. to about −15°F., it is physically unstable, that is, the margarine texture breaks down and develops a granular, lumpy appearance, accompanied by loss of body, making the product unsightly and unsalable.

The Prior Art

Much of the early work done on the interesterification of fats and oils is found in patents to Eckey, as for example in U.S. Pat. Nos. 2,442,531, 2,442,532, and 2,442,536. These patents are concerned with directed interesterification and are therefore only generally relevant to the instant invention.

So far as is known, no one has encountered the problem of texture instability of margarine at deep-freeze temperature prior to the instant invention, presumably because no one has heretofore attempted to prepare a margarine having the high polyunsaturated content possible through the instant invention.

A different problem was recognized by Selden, that is, the problem of oiling-off, or the seeping of oil from margarine at temperatures above 70°F. In U.S. Pat. No. 3,353,964, Seldon teaches that this problem can be solved by using in the margarine a corandomized blend of coconut oil and substantially completely hydrogenated rapeseed oil, offering the theory that the saturated $C_{20}$ and $C_{22}$ acids in the corandomized blend provides stiffening power which improves the heat stability of the margarine, while the $C_6$ to $C_{14}$ acids from the coconut oil on the same molecule as the long-chain acids reduces the melting point of the glyceride.

Other investigators have used corandomized blends of safflower oil and other oils in margarine. In each instance the proportion of polyunsaturated fatty acids has been lowered by the introducton of saturated fatty acids in the blend. For example U.S. Pat. No. 2,855,311 to Nelson describes a corandomized blend of safflower oil and lard. U.S. Pat. No. 3,268,340 to Babayan discloses a corandomized blend of safflower oil and a high-lauric oil such as coconut oil.

The preparation of a margarine having a high essential fatty acid content from a corandomized blend of a hydrogenated fat and an oil of high polyunsaturated content is described by Melnick in U.S. Pat. No. 2,921,855. This patent is concerned with a margarine having generally a higher saturated acid content than the margarine of the instant invention, and consequently a lower ratio of polyunsaturated-to-saturated acids, without the texture problem at deep-freeze temperatures.

Still other investigators have reported on the fatty acid distribution of safflower oil. Scholfield and Dutton in J.A.O.C.S. 35 493–496 (October 1958) describe experiments from which they conclude that natural safflower oil has a random configuration.

Gunstone and Qureshi in J.A.O.C.S. 42 961–965 (1965) present data which show that linoleic acid occurs on the 2-carbon (beta carbon) of glycerol in safflower oil more frequently than would by the case under random distribution. It was concluded by these authors that the fatty acids in safflower oil are not randomly distributed with respect to alpha-beta positioning.

SUMMARY OF THE INVENTION

It has now been discovered that the problem of instability of margarine having a high content of polyunsaturated fatty acids at deep-freeze temperatures can be alleviated by employing oil that has been randomly interesterified.

Scholfield and Dutton's conclusion that natural safflower oil has random configuration appears to be at variance with the instant finding that randomization of natural safflower oil changes its properties in margarine with respect to texture stability at deep-freeze temperatures. This change in property, i.e., texture stability at deep-freeze temperatures, is a property on which the present invention is predicated, and since the margarine is unstable when natural safflower oil (or other oil having at least 65 percent polyunsaturated fatty acids) is used, by texture-stable when the oil is subjected to a randomization process, it becomes clear that the randomizing process causes a change in structure.

Accordingly it is an object of the invention to prevent adverse texture change in a margarine having a hard stock component and a liquid oil component with at leastt 65% polyunsaturated fatty acids, by employing as the said liquid oil component one that has been at least partially randomly interesterified.

It is another object of the invention to provide a margarine having a content of polyunsaturated fatty acid of about 62 to about 70 percent, based on the total fatty acids content, and wich does not undergo adverse texture change over prolonged periods of storage at $-10°$ to $-15°F$.

It is still another object of the invention to provide a margarine having a high content of polyunsaturated fatty acids, which is stable for prolonged periods at $-10°$ to $-15°F$., and which contains hard stock that is not corandomized with the liquid stock thereby retaining the ful l bodying and stiffening effect of the hard stock.

These and other objects of the invention are accomplished by incorporating into the non-hydrogenated liquid stock a randomly interesterified safflower oil or other oil of high polyunsaturated content as a part or all of the liquid stock.

In the practice of the instant invention the liquid oil component may be a single oil having a polyunsaturated fatty acid content of at least about 65 percent, or a mixture of such oils. The liquid oil component may also contain a minor proportion of oils having a polyunsaturated content slightly lower than about 65 percent, for example from about 50 to about 65%, provided that the margarine made therefrom, having both liquid and hard stock components, has a polyunsaturated-to-saturated fatty acid ratio within the range of about 3.5 to 1 to about 5 to 1. To correct the texture problem under deep-freeze conditions the higher polyunsaturated content oil or mixture may be randomized alone or may be mixed with the lower polyunsaturated content oil before randomizing provided that at last 25 percent of the higher polyunsaturated content oil is randomized.

In ins broadest aspect, the invention comprises a margarine having about 80 to about 95 percent of a glyceridic aleagenous mixture and the balance an aqueous phase, said aleaginous mixture containing about 80 to about 94 percent of a non-hydrogenated glyceride oil having a major proportion of a triglyceride component with a polyunsaturated fatty acid content of at least 65 percent which is at least 25 percent randomly interesterified, said hard stock comprising triglycerides having an iodine value between about 35 and 60 and a saturated fatty acid content of between about 25 and 60 percent of the total fatty acids, the ratio of polyunsaturated fatty acids to saturated fatty acids in said oleaginous mixture being from about 3.5 to 1 to about 5 to 1.

As a preferred embodiment, the invention comprises a margarine having about 80 percent of a glyceridic aleaginous mixture and about 20 percent aqueous phase, said mixture containing about 80 to 94 percent non-hydrogenated safflower oil and the remainder a hard stock and minor additives, said safflower oil consisting essentially of a member of a group consisting of randomly interesterified safflower oil and a mixture of at least about 25 percent randomly interesterified safflower oil and the balance non-interesterified safflower oil, said hard stock comprising triglycerides having an iodine value between about 35 and 60 and a saturated fatty acid content of between about 25 and 60 percent of the total fatty acids.

The expressions "oleaginous mixture" and alternatively "glyceridic oleaginous mixture" are intended herein to refer to the total mixtures of oils and fats, both saturated and unsaturated, contained in the margarines of the invention and includes the minor additives solubilized in the oils and fats such as stabilizers, preservatives, and the like.

The naturally occurring glycerides comprise predominantly triesters, the molecules of which have a glyceryl radical combined with three fatty acid acyl radicals.

The triesters are often referred to as triglycerides, and the partial esters, i.e., mono- and diesters, are referred to as monoglycerides and diglycerides, respectively.

The term "total fatty acids" is well known in the fats and oil art to refer to the amount of fatty acids that can be obtained from a fat or oil by hydrolysis or alkaline saponification, followed by solvent extraction or other separation from an acid aqueous medium.

When reference is made in the specification and claims to the percentage of polyunsaturated of saturated fatty acid content of an oil, it will be understood that the percentage is calculated on the basis of the total fatty acid content.

The unqualified term "oil" as used throughout this specification and claims refers to glycerides that are pourable at room temperature (about 25°C.), and more particularly to the pourable oils composed principally of triglycerides, either natural, or synthesized for example by reacting glycerol or a partial glyceride with a natural or synthetic fatty acid.

By random interesterification is meant the interchange of fatty acid radicals on the glyceryl radicals in random fashion. The interchange continues dynamically when the oil is in the liquid state under the influence of a catalyst, until the mixture of molecular configurations reaches an equilibrium in accordance with the laws of probability. The term "molecular configuration" refers to the identity of the three fatty acid, or acyl (RC=0) radicals combined with one glyceryl radical. All three fatty acid radicals in some molecules will be saturated, and in others unsaturated, either of the same chain length or of differing chain lengths. In other molecules, there will be two saturated and one unsaturated fatty acid radicals and in still others this pattern will be reversed, the several chain lenghths being randomly distributed. The overall combined fatty acid distribution with respect to chain length and degree of unsaturation is not altered by the random interesterification process. Molecules of glycerides having mixed combined fatty acid radicals will include those known as, for example, trilinolein, dilinolein monoolein, dilinolein monostearin, tristearin, distearin-monoolein, distearin-monopalmitin, monostearin diolein, dimyristin-monoolein, triolein, etc. Thus RC in the acyl radical RC=O shown above may be a saturated hydrocarbon radical such as $C_{12}H_{25}^{116}$, $C_{14}H_{29}^{116}$, $C_{16}H_{33}^{116}$, $C_{18}H_{37}^{116}$, $C_{20}H_{41}^{116}$, or the corresponding mono- or polyunsaturated radicals. The natural oils do not contain important proportions of unsaturated radicals having chain lengths under $C_{18}$.

Randomization as understood to take place for use in the invention includes random positioning of the fatty acid radicals within a triglyceride molecule with respect to alpha-beta positioning, as well as random distribution of the fatty acids among the glycerol molecules. The randomized mixture will contain for example:

a. alpha-alpha-distearin-beta-monoolein
  b. alpha-alpha dilinolein-beta-monoolein
  c. alpha-monostearin-alpha monopalmitin-beta-linolein
  d. alpha-alpha-dilinolein-beta monomyristin
  e. alpha-beta dilinolenin, alpha monopalmitin
  f. trilinolein Those skilled in the art will know all the possible configurations, only a few of which are set forth above.

The molar precentage of the trisaturated, triunsaturated, and mixed saturated-unsaturated molecules, leaviing out of consideration the varying molecular weights of the mixed fatty acids and the possible positional isomers, may be calculated by the following formula, based on the formula found in Bailey, "Industrial Oil and Fat Product" Second Ed., 1951, Interscience Publishers, Inc., pagee 834.

% trisaturated = $(\bar{s})^3 \times 1/10,000$

% disaturated-monounsaturated = $3 \times (\bar{s})^2 \times 1/10,000 \times \bar{u}$ % diunsaturated-monosaturated = $3 \times \bar{s} \times (\bar{u})^2 \times 1/10,000$ % triunsaturated = $(\bar{u})^3 \times 1/10,000$ wherein $\bar{s}$ = the molar percentage of saturated acids
$\bar{u}$ = the molar percentage of unsaturated acids
and
$\bar{s} + \bar{u}$ 100

In the randomizing process, any of the recognized alkaline catalysts, such as a sodium alkoxide having from 1 to about 4 carbon atoms, sodium metal, sodium-potassium alloy, sodium hydroxide, etc. may be used. A sodium alkoxide is preferred. The process may be carried out at temperatures as high as about 150°C. and as low as about 15°C., so long as the oil remains liquid. Usually it is not necessary to use a temperature outside of the range of about 50°to 100°C., and within this range a temperature of about 70°C. is commonly used. Processing time is usually ½ to 1 hour.

It is theorized that the stability obtained through the use of randomized safflower oil is due to the slight increase in the content of trisaturated and disaturated molecules, along with possibly some alpha-beta shifting, to produce crystal matrices that are less subject to phase changes with slight temperature fluctuations under deep-freeze conditions.

The attributing of the excellent stability resulting from the instant invention to the increase in di- and trisaturated molecules as discussed immediately hereinabove, is set forth as a theory, to which however it is not desired to be held.

It is a part of the invention advance of the instant invention that the increase in disaturated-monounsaturated and trisaturated molecules is accomplished without lowering the proportion of polyunsaturated acids.

It has been observed, as shown below in Example 1, that when the entire amount of safflower oil used is randomized, the margarine made therefrom is stable at minus 10°F., but exhibits slight emulsion instability when stored at room temperature for several days. However when the same amount of non-randomized safflower oil is used, the margarine is texturally unstable at minus 10°F., but the emulsion is considerably more stable at room temperature.

The emulsion instability can be demonstrated by disturbing the surface of the margarine such as by cutting or scraping, whereupon some liquid oil collects at the disturbed area.

In the normal channels of commerce, the margarine is desirably stored under deep-freeze conditions for relatively long periods of time, while once in the hands of the consumer, the time during which the margarine would be exposed to room temperature conditions is relatively short, consequently protection of the margarine at deep-freeze temperatures is of prime importance.

The margarine contemplated within the instant invention preferably is the type that has become increasingly popular in the past few years, referred to as "soft" margarine. This margarine is only slightly softer than the conventional print margarine, but too soft to withstand commercial handling if packaged in print form. Consequently the soft type margarine is packaged in "tubs", or small containers, usually made of plastic, and which are sometimes decorated for a more attractive appearance.

The solid fat index (SFI) of the margarine is somewhat lower than conventional print margarines due to the high content of liquid oleaginous ingredients. The margarine of the invention has the following range of SFI values:

about 2.6 to 9 at 32°F.
  about 1.8 to 6 at 70°F.
  about 0.4 to 3.5 at 92°F.
  about 0 to 1.0 at 104°F.

The softness of the margarine of the invention may be judged by a comparison of penetrometer readings and solid fat indexes (SFI) of a margarine within the invention (Example 3) and of conventional print margarines and butters. These characteristics are set forth in table II below.

TABLE II

|  | Penetration | | SFI | | |
|---|---|---|---|---|---|
|  | 45°F. | 70°F. | 32°F. | 70°F. | 92°F. |
| Margarine of Ex. 3 | 230 | 343 | 6.4 | 4.2 | 1.7 |
| Print Margarines | 100–130 | 230–300 | 19–21 | 11.7–14 | 3.5 max |
| Butters | 35–76 | 133–300 | — | — | — |

The greater penetration and lower solids content of the margarine of the invention provides an estimate of its softness as compared with that of well known spreads.

The penetration values are obtained by allowing a 47-gram cone having an apex angle of 15°46' to drop vertically on the body of the margarine from a height of 20 mm. The number of tenths of a millimeter which the cone penetrates below the surface is recorded as the "penetration".

The solid fat index (SFI) is calculated from dilatometer measurements as described in AOCS Tentative Method Cd 10-57 (1961).

The margarine of the instant invention may be prepared by any conventional process. By way of general description, the process comprises randomly interesterifying a glyceride oil which preferably has been refined and bleached and which has a polyunsaturated fatty acid content of at least 65 percent, based on the weight of the total fatty acids, then with or without the addition of nonrandomized glyceride oil having a polyunsaturated fatty acid content of at least 50 percent, blending in a hard stock having the characteristics hereinafter defined, subjecting the blend optionally to a refining process, then to a deodorizing process, followed by mixing in an edible emulsifier, such as mono- and diglycerides, lecithin, or sodium monostearin sulfoacetate, and if desired, colorants (carotene) and vitamins. The oleaginous mixture of oil, hard stock, emulsifier, and optionally, colorant and vitamins, is emulsified with an aqueous phase to form a water-in-oil emulsion at a temperature at which the oleaginous mixture is liquid, preferably about 40°–42°C. The water usually but not necessarily, has dissolved therein one or more of the substances listed in table III. Skim milk may be used in place of water. The emulsion is pumped through a scraped-surface heat exchanger such as a Votator, a description of which is found in "Industrial Oil and Fat Products", Bailey 3rd ed., p. 1066, Interscience Publishers, Inc. 1964. If a slightly aerated product is desired, a gas such as nitrogen or air is introduced into the emulsion prior to reaching the heat exchanger. The emulsion is supercooled in the Votator and leaves the A unit in a substantially liquid state. It is then passed through the B unit (mixer) with release of pressure if the gas has been incorporated, and a change in state of the gas from solution to occlusion while the fat is crystallizing. The margarine leaving the B unit is run into containers, serving as molds, and tempered to solidify into a firm, shaped mass. Preferably the tempering is carried at a temperature of about 7°C. to about 10°C. and for a time of about 24 hours, but may be carried out at room temperature if desired.

Federal Standards of Identity require that margarine contain at least 80 percent fat (herein "oleaginous mixture"). Accordingly a preferred food product of the present invention comprises a margarine having at least 80 percent fat, the balance being an aqueous phase. The benefits of the invention are realized when the fat content is about 80 to about 95 percent and even below this range.

The content of polyunsaturated fatty acids will be from about 60 to about 75 percent. Although the polyunsaturated fatty acid may be somewhat lower, for example, about 58%, it will be understood that the instant invention is of greatest benefit when the polyunsaturated fatty acid content is in the upper region of a practical range, for example about 60 to about 75 percent, and preferable from about 64 to about 70 percent, based on the weight of the oleaginous mixture.

The non-hydrogenated glyceride oils necessary for the practice of the instant invention have a linoleic acid content of about 65 to about 79 percent, and a saturated fatty acid content — substantially all palmitic and stearic ($C_{16}$–$C_{18}$) acids — of about 5 to about 13 percent.

Safflower oil useful in the practice of the invention may have a linoleic acid content of about 73 to about 79 percent, and a saturated fatty acid content of about 7 to about 12 percent, based on the weight of the total fatty acids in the oil.

The safflower oil used in the Examples is identified as follows:

| | |
|---|---|
| Iodine Value | 145 |
| Palmitic Acid | 7.1 percent |
| Stearic Acid | 2.9 percent |
| Oleic Acid | 14.0 percent |
| Linoleic Acid | 75.5 percent |
| Linolenic Acid | 0.2 percent |
| Other Acids, Saturated | 0.2 percent |
| Other Acids, Unsaturated | 0.1 percent |
| Solid Fat Index | 0 at 0°C. |

The acids listed above are of course present as glycerides.

Throughout the specification, figures representing percentage of fatty acids in an oil are percentages based on the total fatty acid content of the oil.

The molecular configuration before randomization with respect to saturated acids, oleic acid and linoleic acid, is as follows:

| | Molar % |
|---|---|
| oleic- saturated-saturated | None |
| linoleic-saturated-saturated | 2 |
| oleic-oleic-saturated | 1 |
| linoleic-oleic-saturated | 7 |
| linoleic-linoleic-saturated | 18 |
| oleic-oleic-oleic | 1 |
| linoleic-oleic-oleic | 5 |
| linoleic-linoleic-oleic | 19 |
| linoleic-linoleic-linoleic | 47 |
| | 100% |

Expressed in terms of molar percentage of saturated and unsaturated fatty acids, the structure before and after randomization is as follows:

| | Before | After |
|---|---|---|
| trisaturated | None | 0.1 |
| disaturated | 2 | 3.5 |
| monosaturated | 26 | 23.9 |
| tri-unsaturated | 72 | 72.5 |

The hard stock may be any glyceride oil or mixture thereof characterized by an iodine value between about 35 and about 60, and preferably between about 40 and about 55, and by a saturated acid content of between about 25 and about 60 percent, preferably between about 33 percent and about 53%, based on the total fatty acid content. Suitable hard stocks are partially hydrogenated rapeseed oil having an iodine value of 53–55, a 50/50 mixture of cottonseed winter oil stearine and peanut oil having an iodine value of 40–50, or partially hydrogenated cottonseed, soybean, peanut, corn, safflower, or mustardseed oils or mixtures of the above, having iodine values between about 35 and about 60. In general, the higher the proportion of hard stock in the margarine, the higher the iodine value should be within the above-mentioned range.

Cottonseed winter oil stearine is the term applied to the solid fraction from the winterizing of cottonseed oil. In a winterizing process, the oil is chilled for example to about 45° to 50°F. and the solid components allowed to crystallize over a period of time. The solid fraction is then separated from the liquid fraction. The solid fraction or "stearine" contains some entrapped liquid oil, the amount being variable from batch to batch. The iodine value (I.V.) of the "stearine" is usually between 75 and 100.

The expression "aqueous phase" herein refers to water or to water with the usual water soluble additives (see table III below) solubilized therein, which is the minor phase of the water-in-oil emulsions (margarines) of the invention.

The aqueous phase may contain water, salt, potassium sorbate, flavor, ground soybean, or milk in the form of whole milk, cream, skim milk, or reconstituted skim milk.

Some suitable compositions for the aqueous phase are set forth in table III. The figures are parts by weight, unless otherwise noted.

TABLE III

|  | Range[a] | 1. | 2. | 3. | 4. | 5. |
|---|---|---|---|---|---|---|
| Salt | 0–4 | 1.75 | 1.0 | 4.0 | 1.75 | — |
| Skim milk | 0–19.7 | — | 18.8 | — | — | — |
| Skim milk solids | 0–2 | 1.63 | — | — | — | 1.80 |
| Water | 0–19.7 | 16.30 | — | 15.77 | 16.30 | 17.87 |
| K-sorbate | 0–0.1 | 0.10 | — | — | 0.10 | 0.10 |
| Flavor | 0–0.03 | 0.03 | — | 0.03 | 0.03 | 0.03 |
| Ground Soybeans | 0–2 | — | — | — | 1.63 | — |
| EDTA[b] | 0–75 ppm | / | / | 75 ppm | / | / |

[a] to a total of 19.7 to 20 parts
[b] disodium calcium ethylenediaminetetraacetate The invention will be more fully understood in view of the detailed description set forth in the Examples which follow, which are illustrative but not limitative of the invention.

EXAMPLE 1

Safflower oil is randomized by the following procedure.

800 to 1000 lbs. of safflower oil is pumped into a tank fitted with a jacket, a stirrer, an evacuating system, and a draw-off valve. The oil is refined by alkali treatment, and then dried for one hour at 150°C. The oil is cooled with stirring at about 70°C. and 0.2 percent sodium methoxide powder added, and the oil stirred for an additional hour at 70°C., under a nitrogen blanket, whereupon the oil becomes interesterified in random configuration, as disclosed elsewhere herein. The process is conducted under a nitrogen blanket to inhibit oxidation.

After randomizing, the oil is washed with water to inactivate the catalyst and to remove alkaline substances, e.g., sodium hydroxide and soaps, derived from the sodium methoxide catalyst, then refined, bleached, aand deodorized.

For the preparation of a margarine, 90 parts by weight of the safflower oil treated as above and 10 parts by weight of 42.3 I.V. 50/50 blend of peanut oil and cottonseed winter oil stearine having a saturated fatty acid content of 53 percent are weighed into a churn at about 55°C. and a monoglyceride made from 82 I.V. cottonseed oil added, along with lecithin, vitamin A, and carotene.

Into a separate tank is placed non-fat dry skim milk which is reconstituted with 10 parts water, pasteurized, and cooled to 40°F. About one-tenth of this milk product is cultured and returned to the tank. Salt, potassium sorbate, and flavor are then added. Nineteen and eight-tenths parts by weight of this aqueous mixture are blended with 80.2 parts by weight of the oil to form a water-in-oil emulsion. The temperature of the emulsion is adjusted to 40°–42°C. and fed at the rate of 220 pounds per hour through a scraped-surface heat exchanger after dissolving sufficient nitrogen gas (12%–14% by volume) under pressure to provide the desired specific gravity to the margarine. The margarine is run in a semifluid state into 8-ounce containers at a temperature of about 14°–15°C. and held at about 7°C. until firm.

The composition of the margarine is as follows:

| Oleaginous Mixture | Parts by Weight |
|---|---|
| Glycerides | 79.794 |
| Mono/diglyceride emulsifier | 0.18 |
| Lecithin | 0.22 |
| Vitamin A and beta-carotene | 0.006 |

| Aqueous Phase | Parts by Weight |
|---|---|
| Reconstituted skim milk (9.1% solids) | 17.924 |
| Salt | 1.75 |
| Potassium sorbate | 0.10 |
| Flavor | 0.026 |
|  | 100.000 |

The polyunsaturated content is 68.1 percent and the saturated acid content is 14.5 percent, based on the total of safflower oil and hard stock. The penetration is 235 at 45°F. and 402 at 70°F. The ratio of polyunsaturated acids to saturated acids is 4.7.

The margarine is stored at minus 10°F. for 26 weeks. At the end of this time the texture is smooth. When stored at room temperature it is observed that the emulsion exhibited some instability as evidenced by the appearance of some free oil in a cavity formed by removing some of the margarine from the surface. This indicates a limited storage stability at room temperature.

EXAMPLE 2

For economic reasons, it will be advisable to admix as much non-randomized safflower oil with the randomized oil as the system will tolerate. Table IV, below shows the textural stability is improved when the proportion of randomized oil is as low as 25 percent of the total liquid oil. Experiments performed to determine the stability of margarine in which the ratios of randomized to non-randomized safflower oil are 50/50, 35/65, and 25/75, in addition to ratios of 100/0 and 0/100 provide stability data, after storage at minus 10°F., in terms of the development of a lumpy, granular texture, which are given in Table IV. A particularly preferred product is one in which about 50 percent of the liquid oil is randomized. At this blend, the texture and body after storage at minus 10°F. are satisfactory, and the free oil formation at room temperature is minimal.

TABLE IV

| Ratio of Randomized to Non-Randomized Safflower Oil | % Hard Stock | Composition of Hard Stock | Penetration 45°F. | Penetration 70°F. | Textural Stability 1 week | Textural Stability 4 weeks | Textural Stability 6 weeks | Textural Stability 12 weeks | Textural Stability 26 weeks |
|---|---|---|---|---|---|---|---|---|---|
| 100/0 | 10 | 43.3 I.V. 50/50 CSWOS and peanut oil | 235 | 402 | S | S | S | S | S |
| 50/50 | 10 | " | 250 | 372 | S | S | S | S[a] | |
| 35/65 | 10.75 | 49.7 I.V. 50/50 CSWOS and peanut oil | 248 | 367 | S | S | S | S[a] | |
| 25/75 | 10.75 | " | 255 | 389 | S | U[b] | | | |
| 0/100 | 10 | 43.3 I.V. 50/50 CSWOS and peanut oil | 223 | 398 | U | | | | |

CSWOS = cottonseed winter oil stearine
U = unstable-lumpy, granular texture and loss of body in less than one week
S = stable-smooth texture
S[a] = believed to be stable for longer periods, but no observations were made beyond the time indicated
U[b] = stable for more than 2 weeks but less than 4 weeks

EXAMPLE 3

A margarine is made as described in Example 1 except that the glycerides are composed of 44.625 percent randomized safflower oil, 44.625 percent non-randomized safflower oil, and 10.75 percent of a mixture of equal parts of cottonseed winter oil stearine and peanut oil having an iodine value of 41.6, and SFI values of 71.5 at 21.1°C., 62.6 at 33.3°C., and 41.7 at 40°C., and a saturated fatty acid content of 52.1 percent. The texture of the margarine does not change after storing more than 4 weeks at minus 10°F. The penetration at 45°F. is 230 and at 70°F. is 343. The polyunsaturated to saturated fatty acid ratio is 4.6.

EXAMPLE 4

A margarine is made by the process of Example 1 except that the glycerides are composed of 88.5 percent randomized safflower oil and 11.5 percent hard stock composed of a 50/50 blend of cottonsed winter oil stearine and peanut oil, this hard stock blend having an iodine value of 42.3, and a saturated fatty acid content of 53 percent.

The margarine has a penetration of 231 at 45°F. and 339 at 70°F. It is still texturally stable upon examination after 13 weeks' storage at minus 10°F. Its polyunsaturated oil content is 67 percent, based on the total of safflower oil and hard stock.

EXAMPLE 5

A margarine is made by the process of Example 1 except that the glycerides are composed of 85 percent randomized safflower oil and 15% hard stock composed of rapeseed oil hardened to an iodine value of 54.7. The saturated fatty acid content of the hard stock is 33 percent.

The margarine has a penetration of 195 at 45°F. and 335 at 70°F. Its polyunsaturated fatty acid content is 64.4 percent, based on the total of safflower oil and hard stock. The ratio of polyunsaturated fatty acids to saturated fatty acids is 4.7. The margarine is texturally stable after 13 weeks' storage at minus 10°F.

EXAMPLE 6

Commercial margarines prepared as described herein have a polyunsaturated to saturated fatty acid ratio not greater than about 5 to 1 for acceptable body at room temperature, although the benefits with respect to textural stability accruing from randomization in accordance with the invention may be noted in softer margarines having a somewhat higher ratio, for example about 6 to 1, as exemplified in Example 6.

A margarine is prepared by the process of Example 1 except that the glycerides are composed of 92 percent randomized safflower oil and 8 percent rapeseed oil hydrogenated to an iodine value of 53–55.

The margarine has a penetration of 399 at 45°F. and is too soft to measure with the above-described apparatus at 70°F. It polyunsaturated fatty acid content is 69.6 percent, and polyunsaturated to saturate fatty acid ratio is 5.8. The margarine is texturally stable at minus 10°F.

EXAMPLE 7

The following compositions represents a margarine within the invention.

Fifty parts of safflower oil wherein 76 percent of its fatty acids is linoleic acid, 1 percent is linolenic acid and 10.0 percent are saturated fatty acids are blended with 40 parts of sunflower oil in which 52 percent of its fatty acids is linoleic acid, 2 percent linolenic acid and 17 percent are saturated fatty acids. The blend is randomly interesterified by the procedure described in Example 1.

Ninety parts of the above interesterified blend and 10 parts of a hard stock comprising a 49-I.V. blend of equal parts by weight of cottonseed winter oil stearine and peanut oil are mixed together and a margarine made therefrom in accordance with the method set forth in Example 1. The hard stock has no polyunsaturates and has 43% saturated fatty acids. The ratio of polyunsaturated to saturated acids in the margarine is 3.7 to 1.

EXAMPLE 8

Following is an example of a margarine utilizing a high-linoleic acid type sunflower oil.

Ninety parts of a sunflower oil wherein the fatty acids contain 70.4 percent linoleic acid and 12.3 percent saturated acids are randomly interesterified in accordance with the procedure of Example 1. To this are added 10 parts of a hard stock comprising a 49 I.V. blend of equal parts of cottonseed winter oil stearine and peanut oil wherein the fatty acids contain no polyunsaturates and have 43 percent saturated fatty acids. The mixture is processed into margarine by the method described in Example 1. The linoleic acid content of the oleaginous mixture of the margarine is 63.4 percent and the saturated fatty acid content is 15.4 percent, to give a ratio of 4.1 to 1.

Having thus described the invention, the modifications thereof falling within the invention will be apparent to those skilled in the art, and the invention is to be limited only by the scope of the appended claims.

What is claimed is:

1. As a new component for margarine having a high polyunsaturated fatty acid content, randomly interesterified tobaccoseed oil wherein the fatty acids that can be obtained therefrom by hydrolysis or alkaline saponification followed by separation from an aqueous medium, have a polyunsaturated fatty acid content of at least 65 percent, based on the total fatty acid content.

2. As a new component for margarine having a high polyunsaturated fatty acid content, randomly interesterified sunflower oil wherein the fatty acids that can be obtained therefrom by hydrolysis or alkaline saponification followed by separation from an aqueous medium, have a polyunsaturated fatty acid content of at least 65 percent, based on the total fatty acid content.

* * * * *